United States Patent Office 3,359,315
Patented Dec. 19, 1967

3,359,315
REDUCTION OF AROMATIC NITRO COMPOUNDS TO AROMATIC AMINES
John Richard Kosak, Wilmington, Del., assignor to E. I. du Pont de Nemours and Company, Wilmington, Del., a corporation of Delaware
No Drawing. Filed Oct. 15, 1964, Ser. No. 404,186
11 Claims. (Cl. 260—575)

ABSTRACT OF THE DISCLOSURE

An improvement in the process of reducing aromatic nitro compounds to aromatic amines in the presence of a metal hydrogenation catalyst, which comprises adding a small amount of hydrazine or a hydrazine derivative to the reacted mixture and heating at 50–150° C. for ¼ to 2 hours, and isolating the amine. The improvement results in an improved amine product in regard to the initial color and the resistance to coloration in storage.

---

This invention is directed to a novel process for the treatment of an aromatic amine with hydrazine or a selected hydrazine derivative to effect a significant improvement in the properties of the product. More particularly, the present invention relates to the addition of a small amount of hydrazine or a hydrazine derivative hereinafter defined to a hydrogenated reduction mass containing an aromatic amine and continuing to heat the mixture in the presence of the metal hydrogenation catalyst before isolating the amine. With this novel treatment, the amine product is uniquely less colored and significantly more resistant to discoloration in storage than the untreated amine.

In the manufacture of aromatic amines the production of water-white or light colored products is often difficult even when the utmost care is taken to ensure a material having a minimum of color. Aromatic amines, including those which are initially free from color, undergo discoloration in storage and are rendered undesirable, if not unfit, for ultimate use. The discoloration not only makes an amine unattractive and appear contaminated, but it impairs the properties of subsequent products made with the amine as an intermediate, for example, dyes; particularly those dyes required to provide light shades and to exhibit brightness.

It is, therefore, an object of this invention to provide an aromatic amine of improved quality. Another object is to produce an aromatic amine that has a minimum of color and that is resistant to discoloration on exposure to light and air in storage.

These and other objects are accomplished by the present novel process as hereinafter defined and illustrated.

More specifically, the present invention is directed to the treatment of aromatic amines produced by catalytic hydrogenation of the corresponding nitro compounds, which treatment comprises the steps of (1) adding to the hydrogenated product after the nitro compound has been substantially completely reduced (i.e. when the hydrogen-uptake has substantially ceased) a small but effective impurity-scavenging amount of hydrazine, or a hydrocarbon substituted hydrazine having a free $NH_2$ group; (2) holding the reaction mass between 50 and 150° C. for about ¼ to 2 hours in the presence of a metal hydrogenation catalyst capable of catalyzing the decomposition of said hydrazine to yield hydrogen; and (3) isolating the aromatic amine having improved color-stability. Preferred embodiments include the preceding process wherein (a) the aromatic amine is 3,4-dichloroaniline produced from 3,4-dichloro-1-nitrobenzene; (b) the aromatic amine is o-anisidine produced from o-nitroanisole; and (c) the aromatic amine is o-toluidine produced from o-nitrotoluene.

The basic hydrogenation process to which the invention improvement may be applied is described, for example, in U.S. Patents Nos. 2,131,734, 2,823,235, 2,857,337, 3,073,865, and 3,145,231. These patents described both hydrogenation catalysts, nitro compounds and hydrogenation conditions including amounts, temperatures and pressures which may be utilized in the practice of this invention.

More specifically, the invention is applicable to mono- and bicyclo amines such as benzenoid and naphthenoid amines which have 1 to 2 amino groups and which have one or more chloro, lower alkyl and lower alkoxyl ring substituents.

Representative amines that are improved in their initial color and stability to discoloration in storage include aniline, o-, m-, and p-chloroaniline, 2,5-dichloroaniline, 3,4-dichloroaniline, 3,5-dichloroaniline, o-, m-, and p-toluidine, 3-chloro-o-toluidine, 5-chloro-o-toluidine, 3-chloro-p-toluidine, 2,4-xylidene, o-, m-, and p-anisidine, o-, m-, and p-phenetidine, m-phenylenediamine, toluene-2,4-diamine, 1-naphthylamine, and 2-methoxy-5-methylaniline.

The improvement in color and resistance to discoloration of the aromatic amines are effected by treating the reduction mass formed by the hydrogenation of the corresponding nitro compound with a hydrazine as defined. The hydrazine compound is convenienely added to the reduction mass while it still contains the dispersed hydrogenation catalyst and the water formed as a reduction product. This addition is made after the hydrogenation is essentially complete, that is, after essentially all the nitro compound has been reacted to form the corresponding amine. Trace amounts of some intermediate reduction products are present.

It is believed that the hydrazine compound in the presence of the hydrogenation catalyst is a more active reducing agent than hydrogen and reduces the trace amounts of incomplete reduction products still present in the reduction mass after the hydrogenation appears to be completed. These incomplete reduction products are considered to be the initiators of color formation within the aromatic amine in storage. During such treatment of the reduction mass at the elevated temperature in the presence of the hydrogenation catalyst, the hydrazine is completely decomposed. No hydrazine compound can be found in the finished aromatic amine.

The hydrazine compounds that may be employed include hydrazine (including hydrazine hydrate) and hydrazines having 1–2 hydrocarbon substituents and a free $NH_2$ group. The hydrocarbon groups are not critical, may be aliphatic, aromatic or mixed aliphatic-aromatic radicals such as alkyl, cycloalkyl, aralkyl, aryl and alkaryl, and normally will contain from 1 to 12 carbon atoms, as illustrated by the following substituted hydrazines, all of which contain an unsubstituted —$NH_2$ group:

| | |
|---|---|
| 1-benzyl-1-methyl | 1,1-dipropyl |
| 1-benzyl-1-isopropyl | 1,1-di-p-tolyl |
| 1-benzyl-1-phenyl | Dodecyl |
| 1,1-bis(2-ethylhexyl) | Ethyl |
| Tert.-butyl | 1-ethyl-1-methyl |
| 1-butyl-1-ethyl | 1,1-hexamethylenediisobutyl |
| 1-tert.-butyl-1-phenyl | |
| Cyclohexyl | Methyl |
| 1-cyclohexyl-1-methyl | 1-methyl-1-o-tolyl |
| Cyclooctyl | (1-naphthyl) |
| Cyclopentyl | (2-naphthyl) |
| 1,1-dibenzyl | Octyl |
| 1,1-dibutyl | Phenethyl |
| 1,1-dicyclohexyl | 1-phenethyl-1-phenyl |
| 1,1-diethyl | Phenyl |

1,1-dimethyl o-Tolyl
1,1-dipentyl p-Tolyl
1,1-diphenyl 2,3-xylyl

Hydrazine and the hydrocarbon-substituted hydrazines having an unsubstituted amino group can be used as such or in the form of derivatives from which the hydrazines may be regenerated by neutralization, ammonolysis and/or hydrolysis, under the treatment conditions of this invention. Such derivatives include commonly available (1) hydrazinium salts, e.g. of mineral and organic acids such as HCl, $H_2SO_4$, acetic acid, and the like and (2) N-acyl compounds such as (a) N-carbamoyl derivatives represented by the semicarbazides, (b) N-aminocarbamoyl derivatives represented by carbohydrazide, and (c) N-alkanoyl and N-aroyl derivatives, i.e. hydrazides, represented by 1-formyl hydrazine, 1-acetyl hydrazine, 1-benzoyl hydrazine and 1,1-phthaloyl hydrazine.

It should be understood that such thypical derivatives are hydrazine precursors from which hydrazine may be formed in situ by the following well-known reaction schemes:

(1) 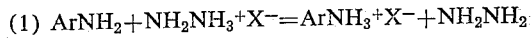
$ArNH_2 + NH_2NH_3^+X^- = ArNH_3^+X^- + NH_2NH_2$ where $X^-$ is a salt-forming anion such as $Cl^-$, $HSO_4^-$, $MeCO_2^-$;

(2) 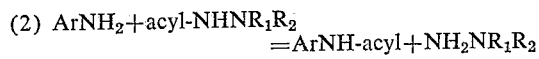
$ArNH_2 + acyl\text{-}NHNR_1R_2$
$= ArNH\text{-}acyl + NH_2NR_1R_2$ where acyl is an aminocarbamoyl, alkanoyl or aroyl radical, Ar is an aryl radical, and $R_1$ and $R_2$ are hydrogen or hydrocarbon radicals, all as described above:

(3) 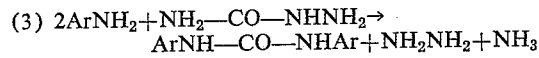
$2ArNH_2 + NH_2\text{---}CO\text{---}NHNH_2 \rightarrow$
$ArNH\text{---}CO\text{---}NHAr + NH_2NH_2 + NH_3$ where Ar is an aryl radical having the significance described above.

It should also be understood that those derivatives having an unsubstituted hydrazinyl amino group, such as semicarbazide or carbohydrazide, in addition to being hydrazine precursors may also react directly with the hydrogenation catalyst for the purposes of this invention, i.e. to yield hydrogen sufficiently active to scavenge color-forming impurities.

In general, the hydrazine derivatives tend to be slower reacting than hydrazine itself and their use may require greater quantities and longer reaction times.

It should also be understod that in view of the hydrogenation conditions prevailing in the reactor system, that hydrazine precursors that form hydrazines on reduction may also be employed in the practice of this invention. For example, on completing the hydrogenation of the aromatic nitro compound, there may be added an N-nitroso secondary amine, such as N-nitrosodimethylamine. Under hydrogen pressure such as nitroso compound is catalytically reduced to the corresponding substituted hydrazine which can function immediately as formed for the purposes of this invention.

Usually the reaction of the hydrazine or its derivative is complete and the maximum effect of it is obtained in the following times, depending on the temperature, at 50° C., two hours; at 100° C., 0.5 hour; at 150° C., 0.25 hour. Intermediate times will be required at intermediate temperatures. When a lesser time than that indicated for a given temperature is allowed, the hydrazine reaction may be incomplete and a diminished improvement in the initial color and resistance to color change of the aromatic amine may result. Common practice is to allow an hour for the reaction at the preferred temperature range of 90°–100° C. to insure a complete reaction. Hold times in excess of this and much in excess of those indicated for the lower and higher temperatures of reaction, while not harmful, accomplish no useful purpose.

The amount of the hydrazine compound employed will depend on the nature of the hydrazine and the number of N-H hydrogens it contains, on the amine system being treated, and on the effect desired. Normally there is employed from about 0.1 to 2%, preferably 0.1 to 0.5%, by weight of the hydrazine based on the aromatic amine to be treated. Lesser amounts may be used but are not always completely effective while greater amounts are usually not needed.

To gain the full effect of the hydrazine, the hydazine or its derivative is added to the reduction mass after the nitro compound is reduced. Otherwise, its effect is decreased in proportion to the amount of nitro compound present, presumably because the hydrazine preferentially reduces the nitro compound and is lost for acting upon the compounds which are unaffected by hydrogen and which impart color and lead to discoloration.

The hydrogenation catalysts that are normally employed for the reduction of the nitro compounds and that also promote the advantageous reductive action of the hydrazine include platinum, palladium, and mixtures of these noble metals, usually supported on carbon black, and nickel. Other group VIII hydrogenation metals such as ruthenium and rhodium may also be used. In the absence of the hydrogenation catalyst, the hydrazine is relatively ineffective, particularly when the undecomposed hydrazine is removed from the amine in the foreshots of a fractional distillation performed to obtain as pure and initially color-free an aromatic amine product as possible.

The proportion of hydrogenation catalyst may vary widely, as even trace quantities are catalytically effective to decompose hydrazine to yield hydrogen. Usually the amount of catalyst will correspond to that used for the catalytic hydrogenation of the nitro compound to the amine. Accordingly, the process of this invention can be carried out sequentially with the hydrogenation of the nitro compound without isolation of the amine reduction product, or it can be applied to color-unstable amine itself by adding both a hydrogenation catalyst (which is also effective to dehydrogenate hydrazines to form active hydrogen) and a hydrazine as described, then heating under the prescribed conditions of time and temperature.

The temperature of the reduction mass is held in the presence of the hydrazine at a temperature between 50° and 150° C. and preferably between 90° and 100° C. At lower temperatures more time is required to effect the invention improvement and the process is unduly prolonged. At temperatures in excess of 150° C. no advantage over operating at lower temperatures is seen; adverse side reactions may occur and losses of hydrazine which has a boiling point of about 114° C. at atmospheric pressure are likely to occur unless the system is held under pressure.

The pressure of the hydrogen during the time the hydrazine is reacting within the reduction mass is not critical. The hydrogen provides a convenient inert atmosphere, and its pressure may range from zero p.s.i.g. to 500 p.s.i.g. The usual hydrogen pressure is zero p.s.i.g.

GENERAL TEST PROCEDURE

The general procedure for testing and measuring the effectiveness of the hydrazine scavenging in aromatic amines in accordance with the invention is as follows. A hydrogenation of an aromatic nitro compound is conducted in the usual way following established practices for plant or laboratory preparation of the corresponding aromatic amine. The resulting reduction mass or a portion of it is divided into two parts. One part is treated with the hydrazine or the hydrazine derivative and the other part remains untreated. The hydrazine treatment consists of mixing the hydrazine with the reduction mass and holding the mixture at an elevated temperature as already described. Each part of the reduction mass is then (1) filtered to remove the suspended catalyst, (2) separated from the water layer, (3) dehydrated, usually by heating under vacuum, and (4) distilled to purify further the amine. Sometimes the distillation step is omitted. The color in the amine is measured initially and after storage in terms of the Gardner Color scale or of percent light transmission. In the examples below, hydrazine where shown was added as an aqueous solution containing from 54 to 95% by weight of $NH_2NH_2$; the quantities are expressed in terms of hydrazine itself.

Representative examples further illustrating the present invention follow.

*Examples 1 through 7*

Various aromatic nitro compounds were hydrogenated in the presence of a catalyst designated as follows:

A. Platinum supported on acetylene black.
B. Mixture of palladium and platinum on acetylene black.
C. Nickel supported on a siliceous material.

In runs 1–6, the temperature was $95 \pm 5°$ C., the hydrogen pressure 400–500 p.s.i.g. and the nitro body to catalyst metal ratio 40,000–60,000:1. In run 7, the hydrogenation temperature was 105–110° C., the pressure 120–130 p.s.i.g., the nitro body to catalyst ratio 20,000:1.

Portions of the resultant reduction masses were treated with 0.5% by weight of hydrazine based on the amine content of the reduction mass and held for one hour at $90° \pm 5°$ C. at atmospheric pressure. These treated materials and portions of the reduction masses that were not treated with hydrazine were worked up as described above including the distillation step. Samples of the products were measured for color and stored in clear glass bottles in ambient light at room temperature for observation of color development. The particular amines produced, the catalyst used in a given preparation, and the effect of the hydrazine treatment as reflected in the improved initial color and resistance to coloration in storage are given in Table I.

mass treated with hydrazine but with no hydrazine detectable in the dehydrated product and then stored for the same period.

Similarly, an untreated sample of distilled 2,4-xylidine (Example 6) was mixed with 0.1% of hydrazine. The initial color was 3, and after 6 days' storage, the color had increased to a value of 10, whereas 2,4-xylidine from the reduction mass treated with hydrazine exhibited an initial color of 1 which increased to only 6 during 6 days' storage.

*Example 8*

A portion of the reduction mass from the hydrogenation of 3,4-dichloro-1-nitrobenzene (carried out at $95 \pm 5°$ C. and 400–500 p.s.i.g. and employing platinum on acetylene black as catalyst in a nitro body to catalyst ratio of 40,000:1) was mixed with 2.0% by weight of hydrazine based on the 3,4-dichloroaniline content of the mass. The mixture was heated one hour at about 100° C. under hydrogen at atmospheric pressure and then it was filtered, separated from the water layer and dehydrated as a means of isolating the 3,4-dichloroaniline. A control sample not treated with hydrazine was worked up in the same way. Since the amine is a solid at room temperature its color was measured by the percentage of transmission of light of wavelength of 4250 A. through a 50 mm. cell containing 1% solution of the amine in o-dichlorobenzene. The treated material transmitted 97.5% of the light while the untreated amine allowed only 83.5% of the light to pass through, indicating a distinct improvement in the initial color of 3,4-dichloroaniline as a result of treating the reduction mass from which it was isolated with hydrazine.

*Examples 9 through 13*

Portions of the reduction mass from the hydrogenation of o-nitrotoluene (which had been run at $95 \pm 5°$ C. and

TABLE I.—EFFECT OF HYDRAZINE TREATMENT OF REDUCTION MASS ON COLOR OF AMINE

| Ex. No. | Aromatic Amine | Catalyst Used in Preparation | Storage, days at Room Temp. | Color, Gardner Scale | |
|---|---|---|---|---|---|
| | | | | Treated Amine | Untreated Amine |
| 1 | Aniline | B | 0 | 1 | 1. |
| | | | 1 | 1 | Brown(>18). |
| 2 | m-Chloroaniline | A | 0 | <1 | 1. |
| | | | 21 | 2 | 4. |
| 3 | o-Toluidine [1] | B | 0 | 3 | 10. |
| | | | 27 | 4 to 5 | 15. |
| | | | 119 | 6 | 16. |
| 4 | do | B | 0 | <1 | <1. |
| | | | 14 | 1 to 2 | 4. |
| | | | 28 | 2 | 12. |
| 5 | o-Anisidine | B | 0 | <1 | <1. |
| | | | 4 | 1 | 15. |
| | | | 14 | 2 to 3 | Dark red. |
| 6 | 2,4-xylidine | C | 0 | 1 | 3. |
| | | | 3 | 3 | 9. |
| | | | 6 | 6 | 15. |
| 7 | m-Phenylenediamine [2] | B | 0 | 1 | 2. |
| | | | 2 | 2 to 3 | Very Dark. |

[1] Dehydrated and not distilled.
[2] Supercooled liquid.

When Example 5 was repeated using 0.3% of hydrazine and holding the hydrogen pressure between 400 and 500 p.s.i.g. while heating the reaction mass at about 90° for one hour, the resultant o-anisidine had an initial color less than 1 and discolored to a Gardner scale value of only 2 in 14 days.

An untreated sample of o-toluidine, dehydrated but not distilled (Example 3), was mixed with 0.1% of hydrazine. The sample had an initial color of 3 on the Gardner scale and a color of 17 after storage for 119 days compared with a color of 6 for the o-toluidine from the reduction 400–500 p.s.i.g. with a mixture of palladium and platinum as catalyst at a nitrobody to metal ratio of 200,000:1) were mixed with hydrazine and hydrazine derivatives and heated for about one hour at 90° to 95° C. The work-up of the samples included distillation. The initial color of the o-toluidine and color developed during storage in bottles about ⅔ full in the dark at 50° to 55° C. were measured by transmission of light at 4100 A. through 100% material in a 10 mm. spectrophotometer cell. The results are given in Table II.

TABLE II.—EFFECT OF SELECTED HYDRAZINE DERIVATIVES ON COLOR AND COLOR STABILITY OF o-TOLUIDINE

| Hydrazine Derivative | Example | | | | |
|---|---|---|---|---|---|
| | 9 | 10 | 11 | 12 | 13 |
| | None [1] | Hydrazine | 1,1-dimethyl hydrazine | Semi-carbazide | Carbo-hydrazide |
| Amount, percent by weight of o-toluidine | | 0.25 | 1.0 | 0.85 | 0.25 |
| Light Transmission, in percent after time in days: | | | | | |
| 0 | 91 | 96 | 92 | 94 | 89 |
| 1 | 51 | 91 | 86 | 80 | 62 |
| 5 | 16 | 79 | 78 | 35 | 29 |

[1] Control.

Hydrazine and 1,1-dimethylhydrazine exhibit a marked stabilizing action in the o-toluidine toward discoloration of the amine in storage. Semicarbazide and carbohydrazide show a lesser, but nonetheless a definite, effect in suppressing color formation in the o-toluidine. An accelerated aging test was employed. Under these conditions, the improvement provided by semicarbazide and carbohydrazide are considered to be significant.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiment of the invention in which an exclusive property or privilege is claimed are as follows:

1. In the process of producing an aromatic amine by the catalytic hydrogenation of the corresponding nitro compound in the presence of a noble metal hydrogenation catalyst, the improvement consisting of adding to the hydrogenated product after the nitro compound has been substantially completely reduced a small impurity-scavenging amount of a member selected from the group consisting of hydrazine and a hydrocarbon substituted hydrazine having a free $NH_2$ group, and holding the temperature of said mass between 50° and 150° C. for about two hours to 15 minutes followed by isolating the resulting amine product.

2. A process according to claim 1 wherein between about 0.1% and 0.5% by weight of said hydrazine compound having a free amino group is added.

3. A process according to claim 1 wherein said temperature is held between 90° and 100° C.

4. A process according to claim 1 wherein the aromatic amine is 3,4-dichloroaniline produced from 3,4-dichloro-1-nitrobenzene.

5. A process according to claim 1 wherein the aromatic amine is o-anisidine produced from o-nitroanisole.

6. A process according to claim 1 wherein the aromatic amine is o-toluidine produced from o-nitrotoluene.

7. A process according to claim 1 wherein said hydrazine compound having an unsubstituted amino group is hydrazine.

8. A process according to claim 1 wherein said hydrazine compound having a free amino group is hydrazine hydrate.

9. A process according to claim 1 wherein said hydrazine compound having a free amino group is 1,1-dimethyl hydrazine.

10. A process according to claim 1 wherein said hydrazine compound is derived from semicarbazide.

11. A process according to claim 1 wherein said hydrazine compound is derived from carbohydrazide.

References Cited
UNITED STATES PATENTS 1,973,724   9/1934   Perkins et al. _____ 260—575

CHARLES B. PARKER, *Primary Examiner.*

P. C. IVES, *Assistant Examiner.*